US012686995B2

(12) United States Patent
Nataraj et al.

(10) Patent No.: US 12,686,995 B2
(45) Date of Patent: Jul. 21, 2026

(54) MULTIFUNCTIONAL TRANSMISSION VALVE WITH INTEGRATED LOAD BRAKE FUNCTION

(71) Applicant: Deere & Company, Moline, IL (US)

(72) Inventors: Gunasekaran Nataraj, Udumalpet (IN); Phillip W. Grommes, Dubuque, IA (US)

(73) Assignee: Deere & Company, Moline, IL (US)

( * ) Notice: Subject to any disclaimer, the term of this patent is extended or adjusted under 35 U.S.C. 154(b) by 101 days.

(21) Appl. No.: 18/911,382

(22) Filed: Oct. 10, 2024

(65) Prior Publication Data

US 2026/0103873 A1 Apr. 16, 2026

(51) Int. Cl.
E02F 9/22 (2006.01)
B60L 7/10 (2006.01)
(Continued)

(52) U.S. Cl.
CPC .............. E02F 9/2228 (2013.01); B60L 7/10 (2013.01); E02F 9/207 (2013.01); E02F 9/2091 (2013.01);
(Continued)

(58) Field of Classification Search
CPC ...... F15B 11/163; F15B 11/165; F15B 21/14; E02F 9/207; E02F 9/2091; E02F 9/225;
(Continued)

(56) References Cited

U.S. PATENT DOCUMENTS

| | | | | |
|---|---|---|---|---|
| 4,930,975 A | * | 6/1990 | Ito | B66F 9/22 |
| | | | | 91/443 |
| 6,989,640 B2 | * | 1/2006 | Yoshimatsu | E02F 9/2292 |
| | | | | 318/140 |

(Continued)

FOREIGN PATENT DOCUMENTS

| | | |
|---|---|---|
| DE | 102008015729 A1 | 7/2009 |
| DE | 102021213343 A1 | 7/2022 |

(Continued)

OTHER PUBLICATIONS

German Search Report issued in application No. 102025128227.7, dated May 22, 2026, 08 pages.

*Primary Examiner* — Michael Leslie
(74) *Attorney, Agent, or Firm* — Lucian Wayne Beavers; Patterson Intellectual Property Law, PC

(57) ABSTRACT

A self-propelled work vehicle includes a vehicle frame and a plurality of wheels or tracks supporting the vehicle frame from a ground surface. A battery provides electrical power to an electric motor. A hydraulic pump provides hydraulic fluid to a hydraulic system. A steering valve directs hydraulic fluid from the hydraulic system to a steering actuator. A steering priority valve prioritizes supply of hydraulic fluid from the hydraulic system to the steering valve. A proportional relief valve provides a load sense signal to the load sense port of the steering priority valve which shifts the steering priority spool to build hydraulic system pressure. A controller is configured to detect whether the battery is able to be further charged and to control operation of the pro- (Continued)

portional relief valve to control a hydraulic braking function provided by the steering priority valve.

16 Claims, 6 Drawing Sheets

(51) Int. Cl.
  *E02F 9/20* (2006.01)
  *E02F 3/96* (2006.01)
(52) U.S. Cl.
  CPC ............ *E02F 9/225* (2013.01); *E02F 9/2253* (2013.01); *B60L 2200/40* (2013.01); *B60L 2240/54* (2013.01); *E02F 3/964* (2013.01)
(58) Field of Classification Search
  CPC . E02F 9/2253; B60K 6/28; B60L 7/10; B60L 7/12; B60L 7/14; B60L 7/16; B60L 7/18; B60L 2200/40; B60L 2240/54
  See application file for complete search history.

(56) References Cited

U.S. PATENT DOCUMENTS

| | | | | |
|---|---|---|---|---|
| 7,770,697 B2 * | 8/2010 | Futahashi | ................. | B66F 9/24 |
| | | | | 60/484 |
| 8,573,339 B2 * | 11/2013 | Futahashi | ............... | B60K 6/48 |
| | | | | 180/65.21 |
| 9,422,949 B2 * | 8/2016 | He | ............................ | B66F 9/22 |
| 9,429,170 B2 * | 8/2016 | Krittian | .................... | B60K 6/12 |
| 9,518,593 B2 * | 12/2016 | Mori | ..................... | E02F 9/2217 |
| 11,459,730 B1 | 10/2022 | Wagner et al. | | |
| 12,460,380 B2 * | 11/2025 | Watanabe | .............. | E02F 9/207 |

FOREIGN PATENT DOCUMENTS

| | | | | |
|---|---|---|---|---|
| DE | 102022210736 A1 | 4/2024 | | |
| WO | WO-2023036683 A1 * | 3/2023 | ............ | E02F 9/2228 |

* cited by examiner

MULTIFUNCTIONAL TRANSMISSION VALVE WITH INTEGRATED LOAD BRAKE FUNCTION

FIELD OF THE DISCLOSURE

The present disclosure relates generally to battery powered work vehicles in, e.g., the construction and/or agricultural industries. More particularly, the present disclosure relates to an improved system for providing a load brake function in a battery powered work vehicle using the hydraulic system.

BACKGROUND

Battery powered work vehicles as discussed herein may for illustrative purposes be referred to as electric backhoes, but such characterization is non-limiting in scope and unless otherwise specifically noted herein alternative work vehicles may for example include excavator machines, compact wheel or track loaders, grading machines, dump trucks, and the like. These machines may have tracked or wheeled traveling devices supporting the undercarriage from the ground surface, and may further include one or more working implements which are used to modify the working environment (e.g., digging, lifting, loading, grading) in coordination with movement of the machine.

There is an ongoing need in the field of such working machines to reduce diesel emissions, while still providing requisite performance. In some jurisdictions, diesel emissions are to be eliminated in passenger vehicles altogether, which may further prompt the desire for all-electric or hybrid diesel-electric work vehicles. The potential benefits of all-electric work vehicles include not only the reduction in emissions of nitrogen oxides and particulates, but also reductions in service times and of noise in the work environment, not to mention fuel savings.

One operational mode that must be considered in a battery powered electric vehicle is the regenerative braking mode. When it is desired to brake the vehicle this is desirably done by using the kinetic energy of the vehicle to drive the electric motor in reverse so that the motor operates as a generator to regenerate electrical energy. This both provides the needed braking and generates electrical energy thus increasing the available run time of the electric vehicle.

But in certain conditions the battery may not be able to receive this additional electrical energy. The battery may already be fully charged, or the battery may be too hot or too cold to accept additional electrical energy. In such situations it may be necessary to provide a further load brake to dissipate the kinetic energy of the vehicle.

BRIEF SUMMARY OF THE DISCLOSURE

The current disclosure provides an improved hydraulic system which provides a hydraulic load brake function using components already present on the vehicle for other purposes.

In an embodiment, a self-propelled work vehicle includes a vehicle frame and a plurality of wheels or tracks supporting the vehicle frame from a ground surface. One or more work implements may be supported from the vehicle frame. A battery provides electrical power to an electric motor. The electric motor may be configured in a drive mode to use electric power from the battery to drive one or more of the wheels or tracks and may be configured in a regenerative mode to regenerate electric power to be stored in the battery when the electric motor is driven by kinetic energy of the vehicle. A hydraulic pump is driven directly or indirectly by the electric motor to provide hydraulic fluid to a hydraulic system of the vehicle. A steering valve is configured to direct hydraulic fluid from the hydraulic system to a steering actuator to steer the vehicle. A steering priority valve is configured to prioritize supply of hydraulic fluid from the hydraulic system to the steering valve. The steering priority valve includes a load sense input port. A proportional relief valve is communicated with the steering priority valve to provide a load sense signal to the load sense input port of the steering priority valve. A controller is configured to detect whether the battery is able to be further charged and in response to a determination that the battery should not be further charged to send an adjustment command signal to the proportional relief valve. According to the command the proportional relief valve may increase the load sense signal from the proportional relief valve to the load sense input port of the steering priority valve so that a standby pressure in the hydraulic system between the pump and the steering priority valve is increased thereby increasing a load on the pump to provide a hydraulic load brake function.

The controller may also be configured to detect a rate of charging of the battery and the adjustment command signal may be based at least in part on the detected rate of charging of the battery.

In another embodiment a method of operating the vehicle described above may include:

in a drive mode, using electric power from the battery to power the electric motor to drive one or more of the wheels or tracks;

in a regenerative mode, using kinetic energy of the vehicle to drive the electric motor to regenerate electric power;

detecting with the controller whether the battery is able to be further charged when in the regenerative mode;

in response to a determination that the battery should not be further charged, sending an adjustment command signal from the controller to the proportional relief valve communicated with the hydraulic system;

adjusting the proportional relief valve in response to the adjustment command signal to provide a load sense signal to the load sense input port of the steering priority valve; and increasing a standby pressure in the hydraulic system between the pump and the steering priority valve in response to the load sense signal and thereby increasing a load on the pump to provide a hydraulic load brake function in response to the load sense signal.

BRIEF DESCRIPTION OF THE DRAWINGS

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
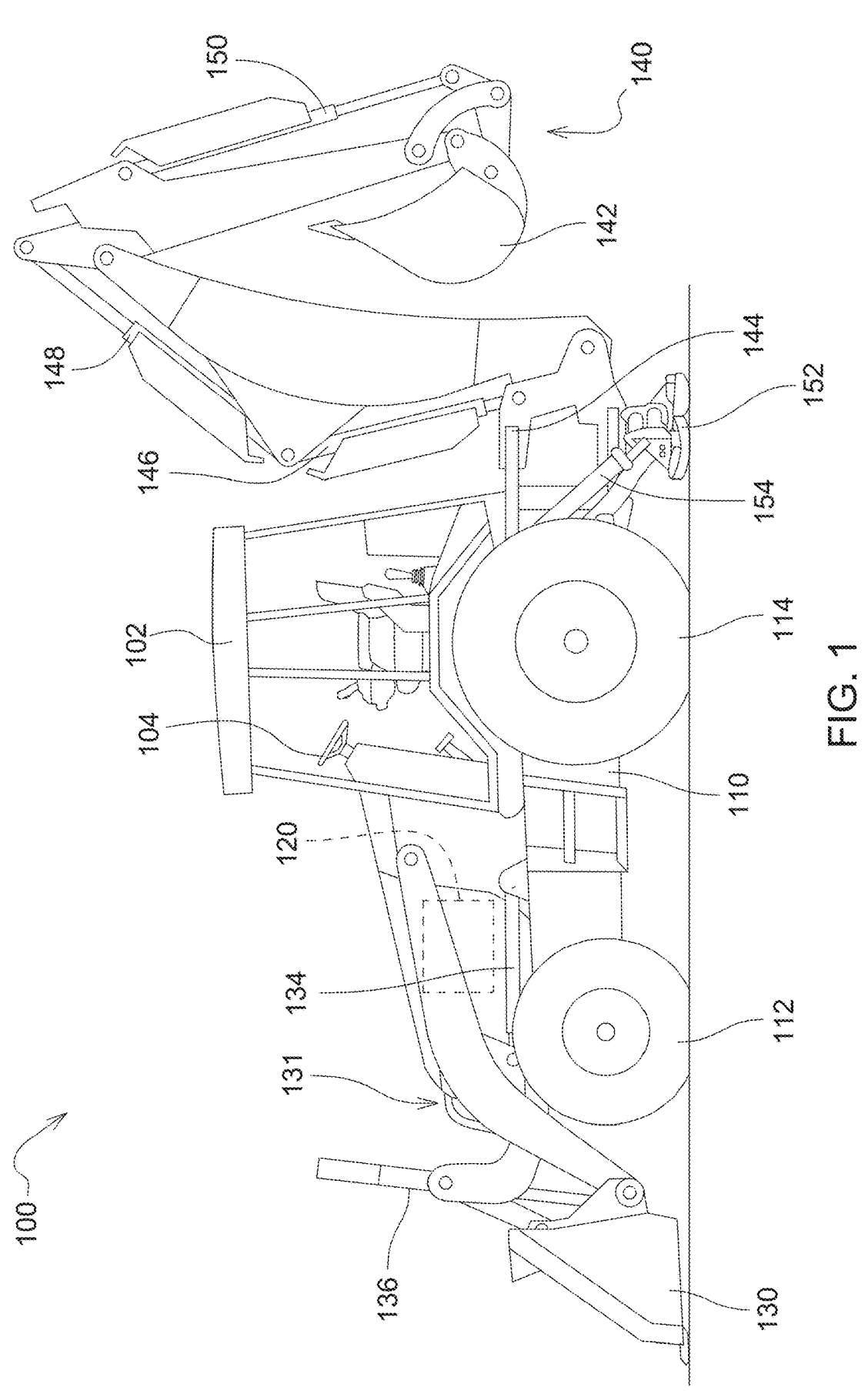
FIG. 1 is a side elevation view of a wheeled backhoe excavator as a battery powered work vehicle incorporating an embodiment of a system and method as disclosed herein.

Referring now to the drawings and particularly to FIG. 1, a representative self-propelled work vehicle is shown and generally designated by the number 100. In the particular example given, and for illustrative purposes throughout the detailed description herein, FIG. 1 shows a battery electric powered loader backhoe 100. The systems disclosed herein may be applicable to similar or otherwise equivalent agricultural, construction, or other vehicles, including for example excavator machines, loaders, graders, and other working machines of the type typically having one or more working implements for modifying the proximate terrain. In certain embodiments, systems and methods as disclosed herein may also be applicable to vehicles lacking explicit work implements.

Figure 2:
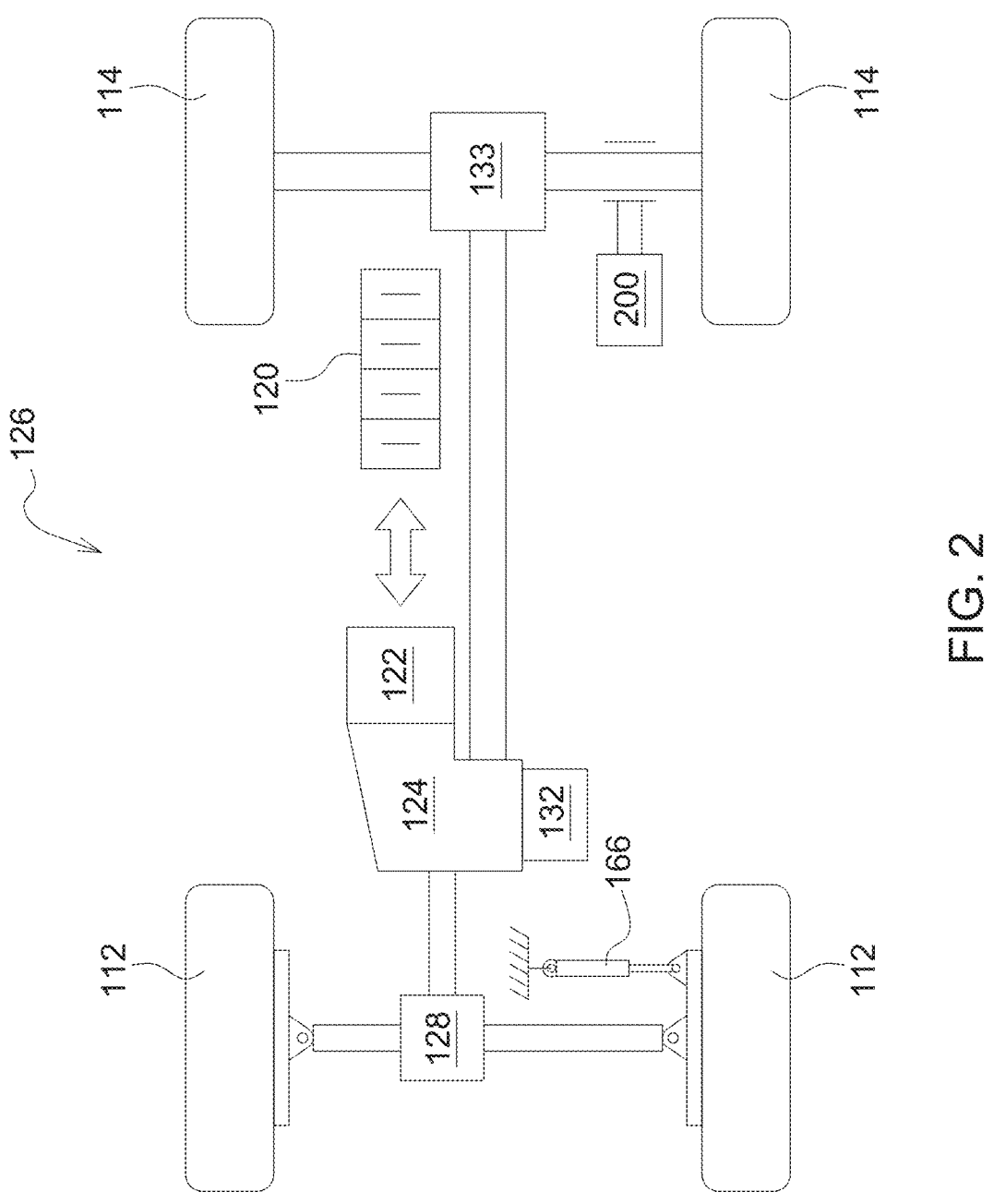
FIG. 2 is a schematic plan view of the mechanical drive train of the vehicle of FIG. 1. The architecture with single electric motor driving both the transmission and hydraulics is shown here. But there could optionally be a two independent motor architecture which powers transmission and hydraulics with separate motors.

Work vehicles 100 as discussed herein may typically have tracked or wheeled traveling devices supporting the undercarriage from the ground surface. The backhoe in FIG. 1 is illustrated with front wheels 112 and rear wheels 114 as the traveling devices. The traveling devices may be implemented within the scope of the present disclosure in alternative embodiments as, e.g., belts, steel tracks, or the like. In one example of use, an energy storage device 120 selectively discharges direct-current (DC) electrical energy to one or more power electronic inverters (not shown) which invert the discharged DC energy into alternating-current (AC) energy. The AC energy may be provided to an AC electric motor 122 which drives the traveling devices via a transmission 124 for causing the vehicle to self-propel across a surface of the ground. A mechanical drive train 126 of the vehicle 100, including the electric motor 122 and transmission 124, is schematically shown in FIG. 2.

The energy storage device 120 may generally be described herein as a battery unit 120 including one or more batteries, or simply as a battery 120. However, the term "battery unit" or "battery" as disclosed herein may encompass various forms of energy storage including for example supercapacitors, electrolytic capacitors, hybrid capacitors, and the like, which may have varying charge and discharge cycles but are otherwise capable of storing sufficient energy for operating the work vehicle 100 in various operating modes for a period of time. The battery unit may be configured to operate with a current charge of anywhere between 0% and 100% of a maximum charge, which preferably may be sufficient to complete at least an eight-hour workday. In various embodiments as disclosed herein the energy storage device may be the primary power source for driving the traveling devices 112, 114, but in alternative embodiments a hybrid configuration may be within the scope of the present disclosure where the energy storage device is used in selective conjunction with an engine-driven AC generator, i.e., to at least assist in operations such as actuation of the traveling devices, work implements, and/or other vehicle components.

The work vehicle 100 includes an operator cab 102 supported by a machine frame or vehicle frame 110 to house and protect the operator of vehicle. The operator cab 102 and the one or more working implements 130, 142 may be mounted on the vehicle frame 110. The operator cab may take numerous conventional forms, including for example one or more user interface devices (not shown) such as a display unit, foot pedals, a steering wheel 104, joysticks, buttons, and any other controls or indicators necessary to operate the vehicle.

As previously noted, the work vehicle 100 may include one or more work implements, which in the illustrated embodiment of FIG. 1 are a front-mounted bucket 130 (i.e., a loader) and a rear-mounted bucket 142 (i.e., a backhoe). In alternative embodiments the work implements may include only one of the aforementioned implements, or, e.g., shovels, blades, tillers, mowers, and the like. Buckets 130, 142 are moveably coupled to the machine frame 110 for working the terrain, e.g., scooping, carrying, and dumping dirt and other materials. The front-mounted bucket 130 may be moveably coupled to a front end of the machine frame 110 via a first boom assembly 131, including a plurality of hydraulic actuators for moving the front-mounted bucket relative to the machine frame. The first boom assembly may include hydraulic lift cylinders 134 for raising and lowering the first boom assembly and a hydraulic tilt cylinder 136 for tilting (e.g. digging and dumping) the front-mounted bucket. The rear-mounted bucket 142 may be moveably coupled to a rear end of the machine frame via a second boom assembly 140, including a plurality of hydraulic actuators for moving the rear-mounted bucket relative to the machine frame. The second boom assembly may include, e.g., a plurality of hydraulic swing cylinders 144 for swinging the second boom assembly from side to side, a hydraulic lift or boom cylinder 146 for raising and lowering the second boom assembly, a hydraulic crowd cylinder 148 for bending the second boom assembly, and a hydraulic tilt or bucket cylinder 150 for tilting (e.g. digging and dumping) the rear-mounted bucket. The operator may selectively control movement of the buckets 130, 142 using controls located within the operator cab, such as one or more of the above-referenced user interface devices.

The exemplary work vehicle 100 as shown in FIG. 1 may still further include right-side and left-side stabilizers 152 for supporting and stabilizing the work vehicle on the ground, especially in modes wherein one or more of the buckets 130, 142 are in operation. Hydraulic lift or stabilizer cylinders 154 may be implemented for raising and lowering the stabilizers 152 relative to the machine frame 110 of the work vehicle.

In FIG. 2 a plan view is schematically shown of the mechanical drive train 126 of the vehicle 100. The drive train 126 includes the electric motor 122 powered by the battery 120 to drive the front and/or rear wheels 112, 114 through the transmission 124. Mechanical power from transmission 124 may be transmitted to the front wheels 112 via a front differential 128, and to the rear wheels 114 via a rear differential 133. The transmission 124 may also drive a hydraulic pump 132 for providing hydraulic fluid under pressure to a hydraulic system 156 schematically shown in FIGS. 4-6. The pump 132 is driven directly or indirectly by the electric motor 122. The pump 132 may be a positive displacement pump, for example a gear pump.

Figure 4:
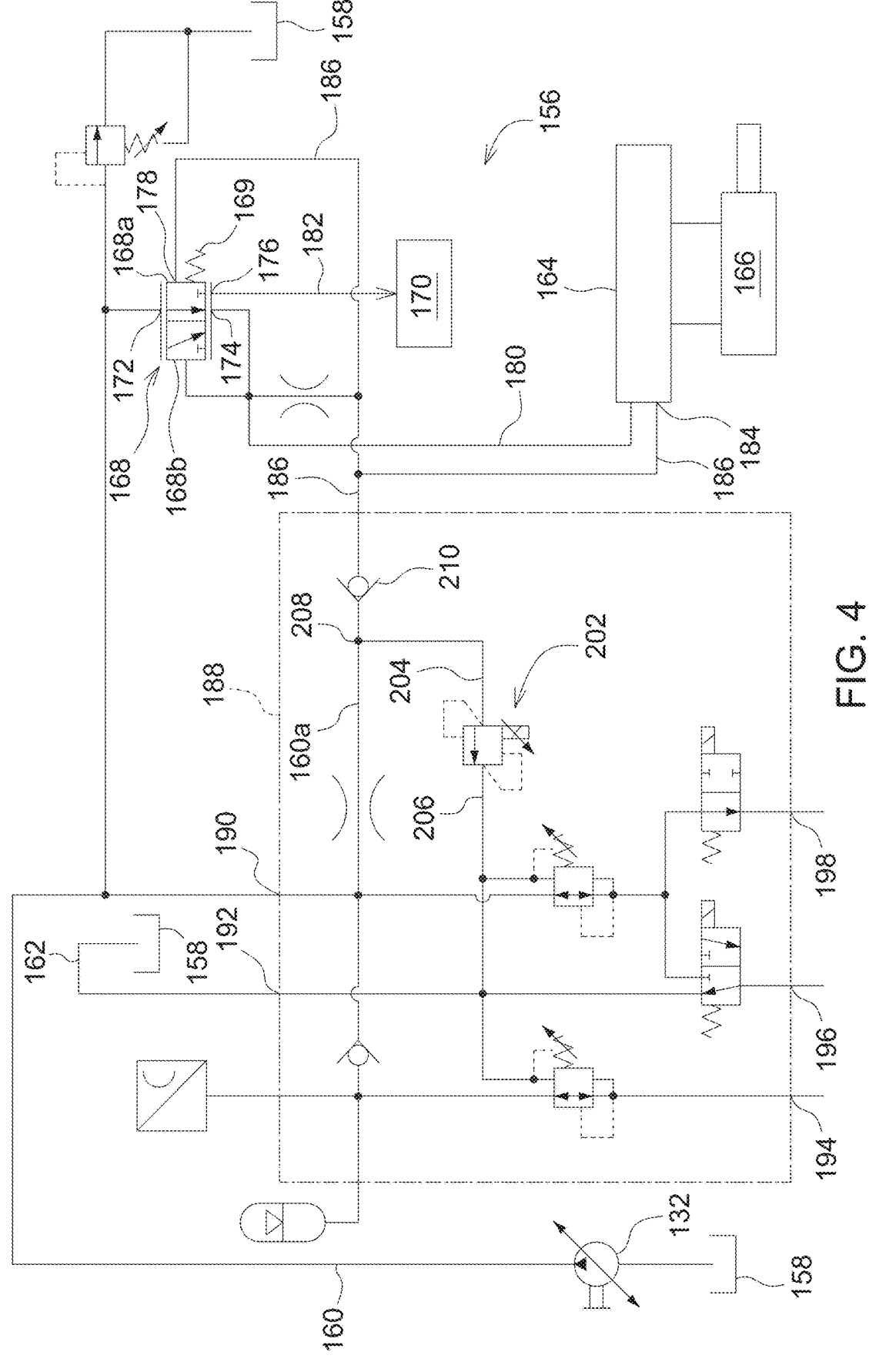
FIG. 4 is a schematic drawing of a portion of the hydraulic system of the vehicle of FIG. 1.

As schematically shown in FIG. 4 the hydraulic system 156 of the vehicle 100 includes the hydraulic pump 132 and a reservoir 158. The hydraulic pump 132 draws hydraulic fluid from reservoir 158 and provides hydraulic fluid under pressure to a fluid supply line 160 which carries the high pressure hydraulic fluid to the various components of the hydraulic system 156. A hydraulic fluid return line 162 returns low pressure hydraulic fluid to the reservoir 158.

The hydraulic system 156 includes a steering valve 164 configured to direct hydraulic fluid from a connecting line 180, and thus from the fluid supply line 160, to a hydraulic steering actuator 166 which steers the front wheels 112.

The hydraulic system 156 further includes a steering priority valve 168 configured to prioritize supply of hydraulic fluid from the hydraulic fluid supply line 160 to the steering valve 164. Steering priority valves are well known hydraulic components designed to insure that the hydraulic power needs of the steering valve 164 are prioritized over the needs of other hydraulic components 170 connected to the hydraulic system 156. This is a safety feature to insure that the vehicle 100 may always be safely steered.

The steering valve 164 may be a closed centered rotary valve connected to the steering wheel 104. Such a closed centered valve does not allow fluid flow therethrough when the valve is not activated to steer the vehicle, and thus when the valve 164 is in a non-activated, i.e. non-steering, mode it provides a dead head against the hydraulic pressure provided from steering priority valve 168 and from the pump 132.

The steering priority valve 168 as schematically shown in FIG. 4 may be a spool valve which is continuously variable in position between a first position 168a in which all hydraulic fluid is directed to the steering valve 164, and a second position 168b in which all hydraulic fluid is directed to other hydraulic components 170, which in the case of the backhoe 100 could include the various hydraulic cylinders 134, 136, 144, 146, 148, 150 and 154 discussed above.

The steering priority valve 168 may include a pressure inlet port 172 communicated with hydraulic fluid supply line 160. A controlled flow outlet port 174 provides hydraulic fluid to the steering valve 164 via connecting line 180. An excess flow outlet port 176 communicates any available excess flow above that needed by the steering valve 164 to the other hydraulic components 170 via a connecting line 182. A load sense input port 178 is communicated with a load sense outlet port 184 of steering valve 164 via connecting line 186.

The steering priority valve 168 includes a spool biasing spring 169 which determines a minimum pump standby pressure which is available in the supply line 160 between the pump 132 and the steering priority valve 168. In the normal operation of the steering priority valve 168, if the steering valve 164 is not activated and if no load sense signal is being provided from the proportional relief valve 202 discussed below, when the system is started up the pump standby pressure in supply line 160 will increase until it reaches the minimum level determined by the spool biasing spring 169, and then the spool will shift to position 168b to allow hydraulic fluid to flow out the excess fluid port 176 to the other hydraulic components 170.

In the normal steering operation of the steering valve 164 when using such a load sensing steering priority valve 168, the working pressure generated in the steering valve 164 is present at load sense outlet port 184 of the steering valve 164 and is communicated to the load sense inlet port 178 of the steering priority valve 168. Then the hydraulic fluid supply line 160 must provide hydraulic fluid of sufficient pressure to overcome the load sense pressure at load sense inlet port 178 plus the spring pressure of the spool biasing spring 169. Thus, if the front wheels 112 are in an environment requiring a heavy steering load, that load is detected and the necessary hydraulic pressure is prioritized to the steering valve 164.

The hydraulic system 156 further includes a transmission control valve 188 represented by the components within the dashed border 188 shown in FIG. 4. The transmission control valve 188 is generally configured to control flow of hydraulic fluid to the various components of the transmission 124 or other related components of the drive train 126. Transmission control valve 188 may include a fluid inlet port 190 communicated with the hydraulic fluid supply line 160 and a fluid outlet port 192 communicated with the return line 162. A first supply port 194 may provide controlled flow of hydraulic fluid to the transmission 124. A second supply port 196 may provide controlled flow of hydraulic fluid to the rear differential 133. A third supply port 198 may provide controlled flow of hydraulic fluid to a hydraulic service brake 200 schematically shown in FIG. 2.

Included in the transmission control valve 188 is an electro-hydraulic proportional relief valve 202. Proportional relief valve 202 includes an inlet 204 communicated with hydraulic fluid supply line 160 via branch line 160a. Proportional relief valve 202 includes an outlet 206 communicated with hydraulic fluid return line 162 and thus with reservoir 158. The inlet 204 is also communicated with the load sense inlet 178 of steering priority valve 168 via the branch line 160a and the connecting line 186 which are joined at connection 208. A one-way check valve 210 is located in the connecting line 186 between the proportional relief valve 202 and the steering valve 164 and permits flow from the proportional relief valve 202 toward the steering valve 164 and the steering priority valve 168. The check valve 210 also ensures that the load sense signal at load sense input port 178 is not getting reduced through the proportional relief valve 202 and sent to the reservoir 158.

As is further described below the proportional relief valve 202 will receive control signals 202C from a controller 220. Proportional relief valve 202 is configured so that if it does not receive a command signal from the controller it dumps any high pressure fluid from inlet 204 to the return line 162 and reservoir 158. If however, the proportional relief valve 202 is closed or partially closed the pressure reaching the inlet 204, or some portion of that pressure, will be communicated through check valve 210 and connecting line 186 to the load sense inlet port 178 of steering priority valve 168.

Figure 3:
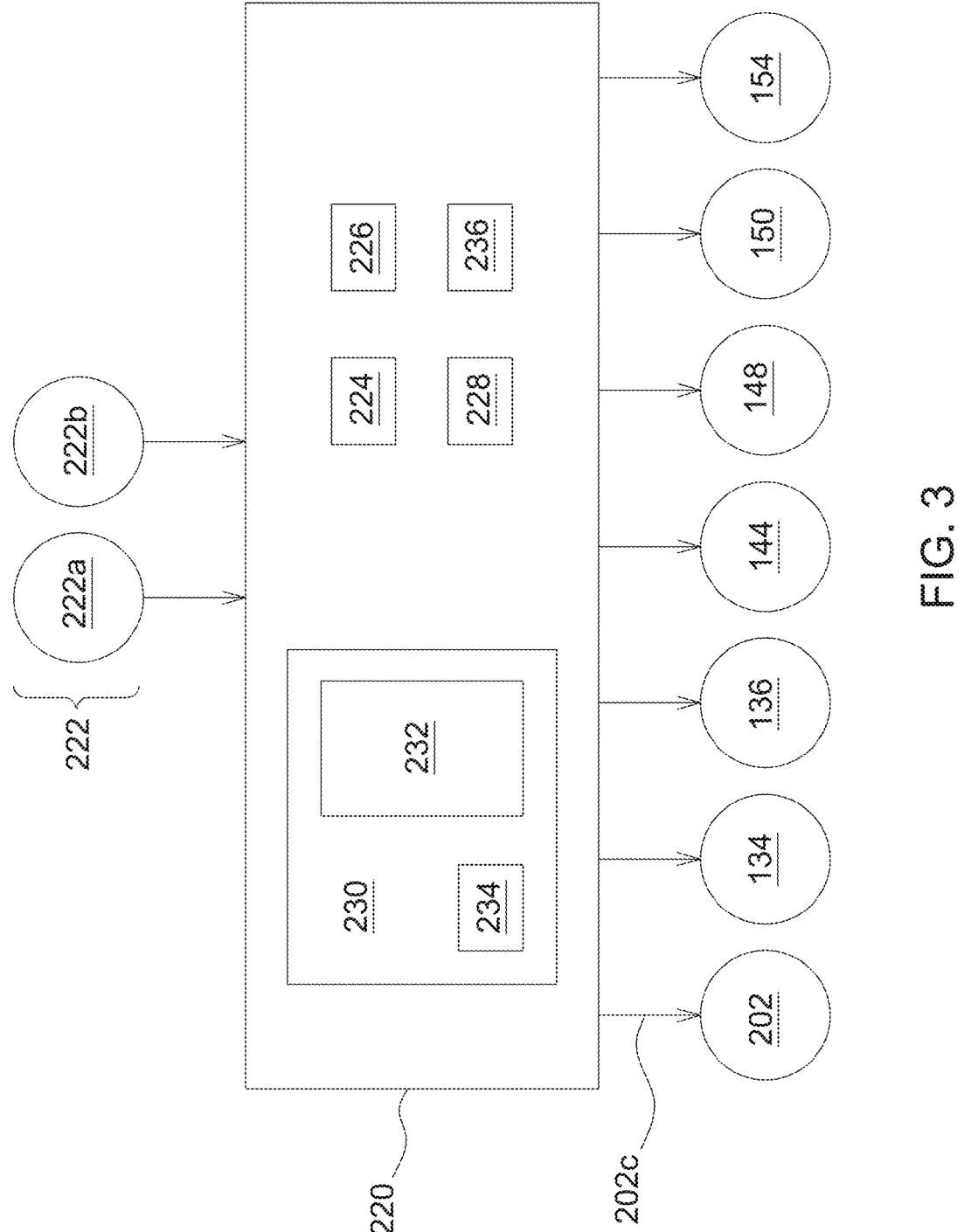
FIG. 3 is a schematic drawing of a control system for the vehicle of FIG. 1.

Control System:

As schematically illustrated in FIG. 3, the work vehicle 100 includes a control system including a controller 220. The controller may be part of a central control system of the work vehicle, or it may be a separate control module. The controller 220 may include one or more user interface devices as referenced above, and may optionally be mounted in the operator cab 102 at a control panel.

The controller 220 is configured to receive input signals from some or all of various sensors collectively defining a sensor system 222. Certain of these sensors may be provided to detect machine operating conditions or positioning, including for example an orientation sensor, global positioning system (GPS) sensors, vehicle speed sensors 222b, vehicle implement positioning sensors, and the like, and whereas one or more of these sensors may be discrete in nature the sensor system may further refer to signals provided from the machine control system. More particularly with respect to embodiments of the present disclosure, the sensor system 222 may further include sensors 222a configured to detect a current charge state of the battery unit 120, collectively or for example as individual values for each of a plurality of batteries associated with a battery unit 120.

Similarly, the controller 220 will generate control signals for controlling the operation of various actuators of the vehicle 100. Those actuators may for example include the various hydraulic cylinders 134, 136, 144, 146, 148, 150 and 154 discussed above.

Controller 220 includes or may be associated with a processor 224, a computer readable medium 226, a database 228 and an input/output module or control panel 230 having a display 232. An input/output device 234, such as a keyboard, joystick or other user interface, is provided so that the human operator may input instructions to the controller. The input/output device 234 may be distributed across multiple locations and may include remote operator input devices. It is understood that the controller 220 described herein may be a single controller having all of the described functionality, or it may include multiple controllers wherein the described functionality is distributed among the multiple controllers.

Various operations, steps or algorithms as described in connection with the controller 220 can be embodied directly in hardware, in a computer program product 236 such as a software module executed by the processor 224, or in a combination of the two. The computer program product 236 can reside in RAM memory, flash memory, ROM memory, EPROM memory, EEPROM memory, registers, hard disk, a removable disk, or any other form of computer-readable medium 226 known in the art. An exemplary computer-readable medium 226 can be coupled to the processor 224 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 226 and/or database 228 may in certain embodiments include a database service, cloud databases, or the like. In various embodiments, the computing network may comprise a cloud server, and may in some implementations be part of a cloud application wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

Modes of Operation:

The electric motor 122 may be embodied as a motor/generator which functions as a motor when electric power is provided to the motor 122 from the battery 120 to drive the transmission 124 and thus the wheels 112, 114 and the hydraulic pump 132. This is referred to as a drive mode of the motor 122. On the other hand, when it is desired to brake the vehicle 100, such as when the vehicle 100 is traveling down an incline, the kinetic energy of the vehicle 100 can be passed from the wheels 112, 114 via the transmission 124 back to the motor 122 to drive the motor as a generator thus regenerating electrical energy which is sent back to the battery 120 to recharge the battery 120. This is referred to as a regenerative mode of the motor 122. The controller 220 monitors and controls the flow of electrical energy between the battery 120 and the motor 122.

As noted, the controller 220 may monitor a charge state of the battery 120 via sensor 222a. The controller 220 may be configured to detect whether the battery 120 is able to be further charged. The controller 220 may also monitor a rate of charging of the battery. In some instances, where the battery 120 is fully charged, too hot, or too cold, and when it is desired to brake the vehicle, it may be undesirable to send further electrical energy to the battery which would overcharge and overheat the battery. In this situation other braking systems may be needed.

Figure 5:
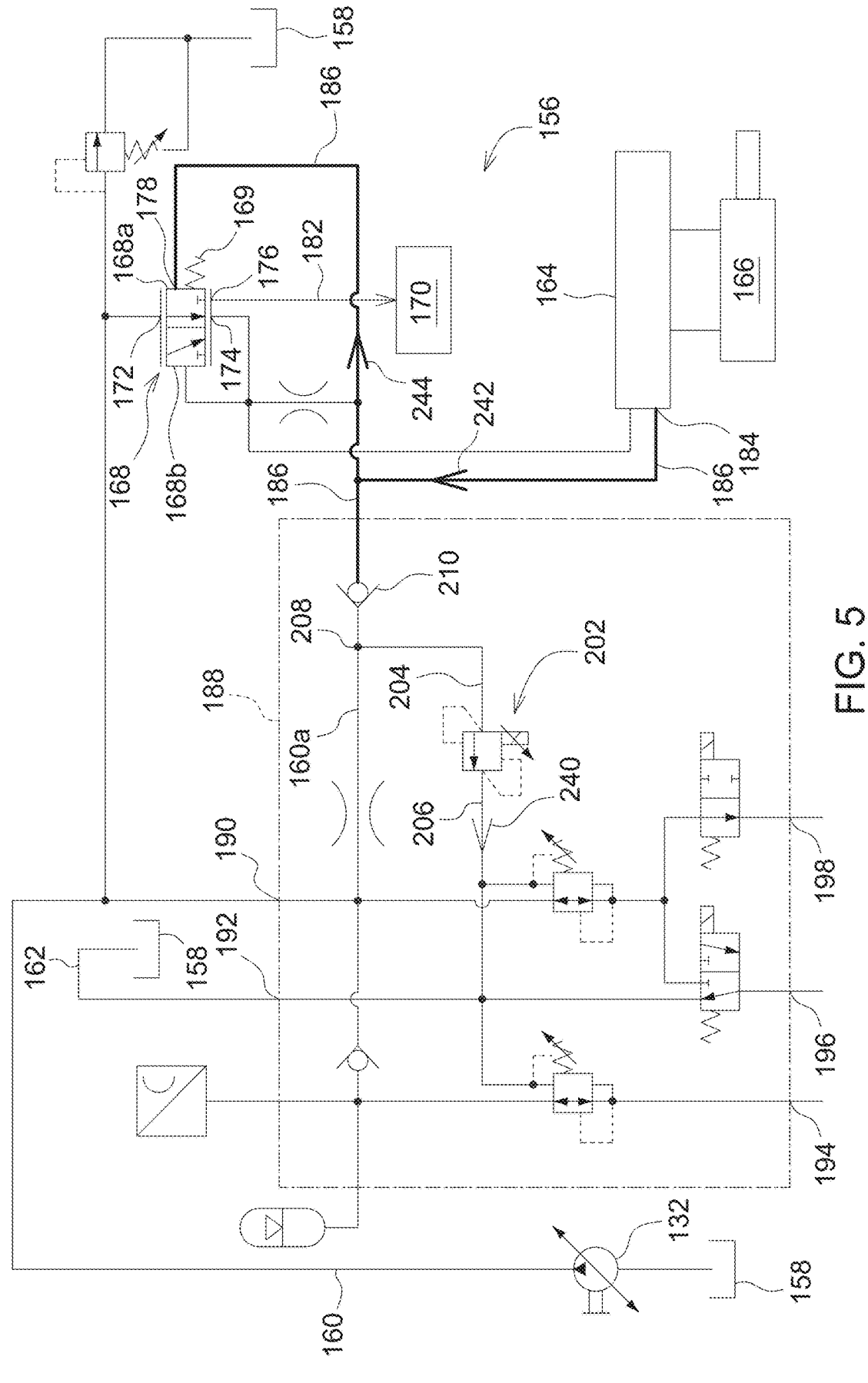
FIG. 5 shows the hydraulic system of FIG. 4 during a normal steering mode of operation.
Figure 6:
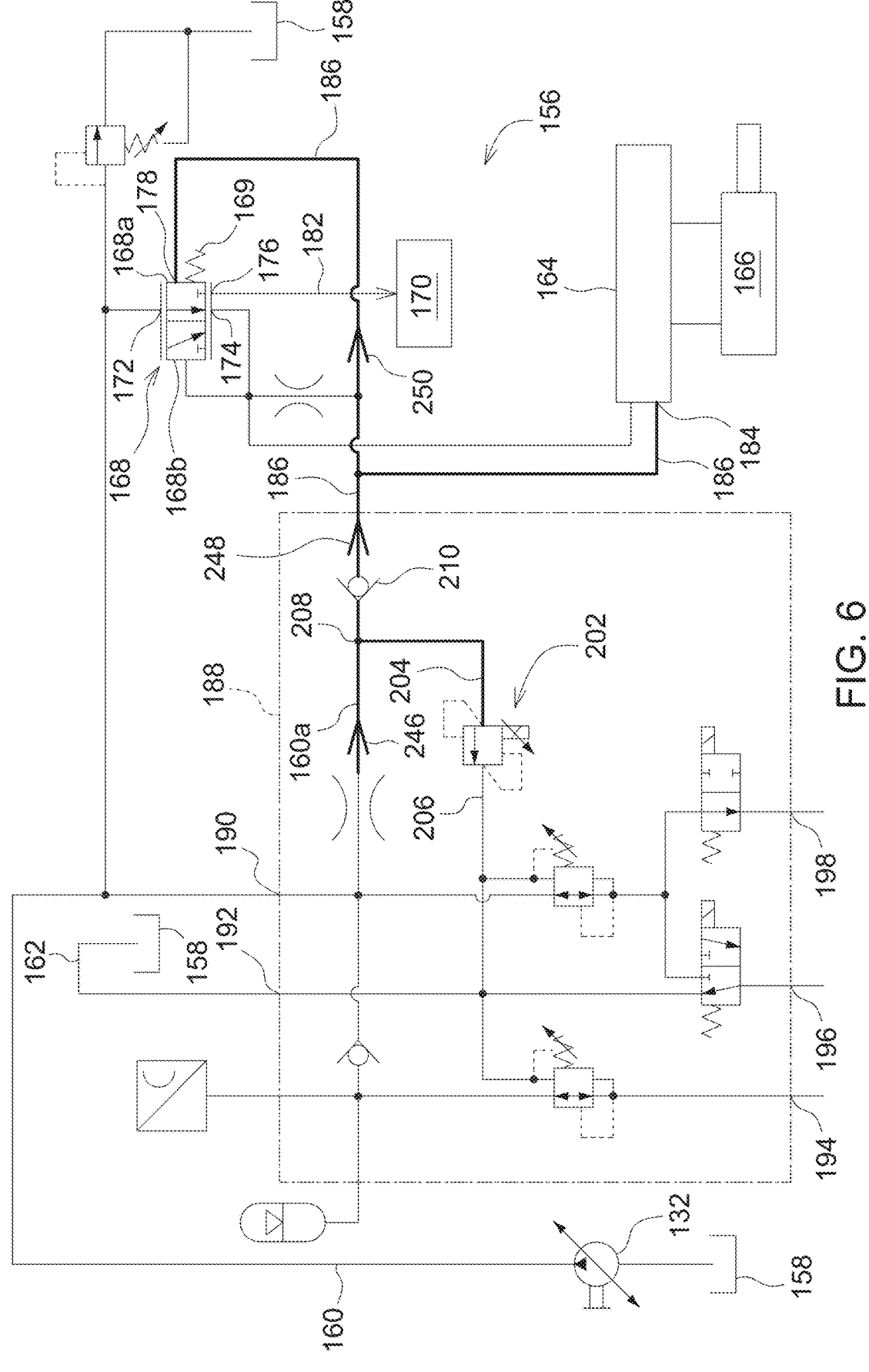
FIG. 6 shows the hydraulic system of FIG. 4 during a no steering with transmission standby mode of operation or in a no steering with load brake mode of operation.

One such additional braking system which is provided by the system shown in FIGS. 4-6 is a hydraulic load braking system. A hydraulic load braking system may be provided by increasing the standby pressure in the supply line 160 of hydraulic system 156 which increases the load on hydraulic pump 132 and thus increases the load on the electric motor 122 thereby reducing the electrical energy being sent to the battery from the energy generated by the motor 122 in regenerative mode. Such a hydraulic load braking function can be provided by controlling the proportional relief valve 202 of the transmission control valve 188 so as to send an appropriate load sense signal back to the load sense input port 178 of the steering priority valve 168, thus increasing the pressure in supply line 160 needed to shift the spool of steering priority valve 168. This increased pressure in the supply line 160 increases the load on the pump 132, thereby dissipating at least a portion of the kinetic energy of the moving vehicle 100.

The controller 220 may be configured to send an adjustment command signal 202C, as schematically represented in FIG. 3, to the electro-hydraulic proportional relief valve 202 to control the degree of closure of the proportional relief valve 202. This command signal may be based at least in part on the detected level of charge of the battery 120 and the detected rate of charging of the battery 120.

Normal Steering Operation Mode:

FIG. 5 schematically illustrates the system of FIG. 4 in a normal steering operation mode wherein no adjustment command signal 202C is provided to the proportional relief valve 202. As previously described, in this condition the proportional relief valve 202 dumps any high pressure hydraulic fluid present at inlet 204 to the hydraulic fluid return line 162 and thus to the reservoir 158, as indicated by arrow 240. In this condition no load sense signal is sent from the proportional relief valve 202 to the steering priority valve 168. During normal steering operation mode the only load sense signal received at load sense input port 178 is the load sense signal from the load sense outlet port 184 of the steering valve 164 as indicated by arrows 242 and 244.

No Steering Operation with Transmission Standby:

FIG. 6 schematically represents two different operational modes in which the proportional relief valve 202 is used to generate a load sense signal which is communicated back to the steering priority valve 168. The first of these modes is referred to as the "no steering operation with transmission standby" mode of operation.

In FIG. 6 the steering valve 164 is not being operated and thus no load sense signal is being generated at the load sense outlet port 184 of steering valve 164. It may be desired to raise the standby pressure of the hydraulic fluid in hydraulic fluid supply line 160 above that which would be present due to the load provided by the other hydraulic components 170. This may be referred to as increasing the pump standby pressure. This can be accomplished by sending an adjustment command signal 202C from controller 220 to proportional relief valve 202 directing a partial closure of proportional relief valve 202 thus raising the pressure at pressure inlet 204, which increased pressure is communicated as a load sense signal back to the load sense input port 178 of steering priority valve 168 as indicated by arrows 246, 248 and 250. This will raise the standby pressure in hydraulic fluid supply line 160. By adjustment of the adjustment command signal 202C the standby pressure in the hydraulic fluid supply line 160 may be adjusted.

No Steering Operation with Load Brake Function:

The schematic of FIG. 6 is also illustrative of the no steering operation with load brake function mode of operation. Again, the steering valve 164 is not being operated and thus no load sense signal is being generated at the load sense outlet port 184 of steering valve 164.

If it is desired to dissipate kinetic energy of the vehicle 100 via a hydraulic load brake function, so as to avoid overcharging of the battery 120 in regenerative mode, this can be accomplished again by sending an adjustment command signal 202C from controller 220 to proportional relief valve 202 directing a partial closure of proportional relief valve 202 thus raising the pressure at pressure inlet 204, which increased pressure is communicated as a load sense signal back to the load sense input port 178 of steering priority valve 168 as indicted by arrows 246, 248 and 250. This will raise the pressure of the hydraulic fluid in hydraulic fluid supply line 160 as described above, thus increasing the load on the pump 132.

By adjustment of the adjustment command signal 202C to the proportional relief valve 202, the magnitude of the load sense signal transmitted to the steering priority valve 168 is adjusted and thus the magnitude of the hydraulic load brake function may be adjusted.

The controller 220 may be configured to detect a level of kinetic energy of the vehicle 100 to be dissipated, for example by monitoring a speed of the vehicle 100 via speed sensor 222b. The controller 220 may be configured to adjust the adjustment command signal 202C and thus to adjust the hydraulic load brake function at least in part in response to the detected level of the kinetic energy to be dissipated.

Methods of Operation:

A method of operating the vehicle 100 described above may include:

> in a drive mode, using electric power from the battery 120 to power the electric motor 122 to drive one or more of the wheels or tracks 112, 114;
> in a regenerative mode, using kinetic energy of the vehicle 100 to drive the electric motor 122 to regenerate electric power;
> detecting with the controller 220 whether the battery 120 is able to be further charged when in the regenerative mode;
> in response to a determination that the battery 120 should not be further charged, sending an adjustment command signal 202C from the controller 220 to the proportional relief valve 202 communicated with the hydraulic system 156;
> adjusting the proportional relief valve 202 in response to the adjustment command signal 202C to provide a load sense signal to the load sense input port 178 of the steering priority valve 168; and > increasing a standby pressure in the hydraulic system between the pump and the steering priority valve in response to the load sense signal and thereby increasing a load on the pump to provide a hydraulic load brake function in response to the load sense signal.

The method may further include in the absence of the adjustment command signal 202C from the controller 220 to the proportional relief valve 202, dumping hydraulic pressure through the proportional relief valve 202 to the reservoir 158 of the hydraulic system 156 so that no load sense signal is provided from the proportional relief valve 202 to the steering priority valve 168.

The method may further include communicating the load sense output port 184 of the steering valve 164 with the load sense input port 178 of the steering priority valve 168 so that the steering priority valve 168 detects a hydraulic pressure needed by the steering valve 164 and prioritizes provision of the needed hydraulic pressure to the steering valve 164.

The method may further include providing a load sense signal from the steering valve 164 to the steering priority valve 168 in a normal steering operation mode wherein no adjustment command signal 202C is provided to the proportional relief valve 202 and no load sense signal is provided from the proportional relief valve 202 to the steering priority valve 168.

The method may further include in a no steering with transmission standby operation mode of the controller 220, sending the adjustment command signal 202C to the proportional relief valve 202 commanding the proportional relief valve 202 to provide a load sense signal to the steering priority valve 168 to control a pump standby pressure provided by the hydraulic pump 132.

The method may further include detecting with the controller 220 a level of kinetic energy of the vehicle 100 to be dissipated and automatically adjusting the adjustment command signal 202C to adjust the hydraulic load brake function at least in part in response to the detected level of kinetic energy of the vehicle 100 to be dissipated.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A self-propelled work vehicle comprising:
   a vehicle frame;
   a plurality of wheels or tracks supporting the vehicle frame from a ground surface;
   one or more work implements supported from the vehicle frame;
   a battery;
   an electric motor configured in a drive mode to use electric power from the battery to drive one or more of the wheels or tracks and configured in a regenerative mode to generate electric power to be stored in the battery when the electric motor is driven by kinetic energy of the vehicle;
   a hydraulic pump driven directly or indirectly by the electric motor to provide hydraulic fluid to a hydraulic system of the vehicle;

a steering valve configured to direct hydraulic fluid from the hydraulic system to a steering actuator to steer the vehicle;

a steering priority valve configured to prioritize supply of hydraulic fluid from the hydraulic system to the steering valve, the steering priority valve including a load sense input port;

a proportional relief valve communicated with the steering priority valve to provide a load sense signal to the load sense input port of the steering priority valve; and a controller configured to detect whether the battery is able to be further charged and in response to a determination that the battery should not be further charged to send an adjustment command signal to the proportional relief valve commanding the proportional relief valve to increase the load sense signal from the proportional relief valve to the load sense input port of the steering priority valve so that a standby pressure in the hydraulic system between the pump and the steering priority valve is increased thereby increasing a load on the pump to provide a hydraulic load brake function.

2. The self-propelled work vehicle of claim 1, wherein:
the controller is further configured to detect a rate of charging of the battery and the adjustment command signal is based at least in part on the detected rate of charging of the battery.

3. The self-propelled work vehicle of claim 1, further comprising:

a transmission connecting the electric motor to one or more of the wheels or tracks; and a transmission control valve, configured to control supply of hydraulic fluid from the hydraulic system to the transmission, the transmission control valve including the proportional relief valve.

4. The self-propelled work vehicle of claim 1, wherein:
the proportional relief valve is configured such that in the absence of the adjustment command signal from the controller the proportional relief valve dumps hydraulic pressure to a reservoir of the hydraulic system so that no load sense signal is provided from the proportional relief valve to the steering priority valve.

5. The self-propelled work vehicle of claim 1, wherein:
the steering valve includes a load sense output port communicated with the load sense input port of the steering priority valve so that the steering priority valve detects a hydraulic pressure needed by the steering valve and prioritizes provision of the needed hydraulic pressure to the steering valve.

6. The self-propelled work vehicle of claim 5, further comprising: a check valve included in the hydraulic system between the proportional relief valve and the load sense output port of the steering valve, the check valve being configured to permit flow from the proportional relief valve toward the steering priority valve.

7. The self-propelled work vehicle of claim 1, wherein:
the controller is configured to provide a normal steering operation mode wherein no adjustment command signal is provided to the proportional relief valve, no load sense signal is provided from the proportional relief valve to the steering priority valve, and a load sense signal is provided from the steering valve to the steering priority valve.

8. The self-propelled work vehicle of claim 1, wherein:
the controller is configured to provide a no steering with transmission standby operation mode wherein the steering valve is not activated and wherein the adjustment command signal is sent to the proportional relief valve commanding the proportional relief valve to provide the load sense signal to the steering priority valve to control a pump standby pressure provided by the hydraulic pump.

9. The self-propelled work vehicle of claim 1, wherein:
the controller is configured to provide a no steering with load brake operation mode wherein the steering valve is not activated and wherein the adjustment command signal is sent to the proportional relief valve commanding the proportional relief valve to provide the load sense signal to the steering priority valve to provide the hydraulic load brake function in response to the load sense signal from the proportional relief valve.

10. The self-propelled work vehicle of claim 9, wherein:
the controller is configured to detect a level of kinetic energy of the vehicle to be dissipated and to adjust the adjustment command signal to adjust the hydraulic load brake function at least in part in response to the detected level of kinetic energy of the vehicle to be dissipated.

11. A method of operating a self-propelled work vehicle, the vehicle including a vehicle frame, a plurality of wheels or tracks supporting the vehicle frame from a ground surface, a battery, an electric motor, a hydraulic pump configured to provide hydraulic fluid to a hydraulic system of the vehicle, a steering valve configured to direct hydraulic fluid from the hydraulic system to steer the vehicle, and a steering priority valve configured to prioritize supply of hydraulic fluid from the hydraulic system to the steering valve, the steering priority valve including a load sense input port, the method comprising:

in a drive mode, using electric power from the battery to power the electric motor to drive one or more of the wheels or tracks;

in a regenerative mode, using kinetic energy of the vehicle to drive the electric motor to regenerate electric power;

detecting with a controller whether the battery is able to be further charged when in the regenerative mode;

in response to a determination that the battery should not be further charged, sending an adjustment command signal from the controller to a proportional relief valve communicated with the hydraulic system;

adjusting the proportional relief valve in response to the adjustment command signal to provide a load sense signal to the load sense input port of the steering priority valve; and increasing a standby pressure in the hydraulic system between the pump and the steering priority valve in response to the load sense signal and thereby increasing a load on the pump to provide a hydraulic load brake function in response to the load sense signal.

12. The method of claim 11, further comprising:
in the absence of the adjustment command signal from the controller to the proportional relief valve, dumping hydraulic pressure through the proportional relief valve to a reservoir of the hydraulic system so that no load sense signal is provided from the proportional relief valve to the steering priority valve.

13. The method of claim 11, further comprising:
communicating a load sense output port of the steering valve with the load sense input port of the steering priority valve so that the steering priority valve detects a hydraulic pressure needed by the steering valve and prioritizes provision of the needed hydraulic pressure to the steering valve.

14. The method of claim 11, further comprising:

providing a load sense signal from the steering valve to the steering priority valve in a normal steering operation mode wherein no adjustment command signal is provided to the proportional relief valve and no load sense signal is provided from the proportional relief valve to the steering priority valve.

15. The method of claim 11, wherein:

in a no steering with transmission standby operation mode of the controller, sending the adjustment command signal to the proportional relief valve commanding the proportional relief valve to provide the load sense signal to the steering priority valve to control a pump standby pressure provided by the hydraulic pump.

16. The method of claim 11, further comprising:

detecting with the controller a level of kinetic energy of the vehicle to be dissipated and automatically adjusting the adjustment command signal to adjust the hydraulic load brake function at least in part in response to the detected level of kinetic energy of the vehicle to be dissipated.

* * * * *